3,143,546
PROCESS FOR THE PRODUCTION OF PIGMENTS OF THE DIOXAZINE SERIES
André Pugin and Jost von der Crone, Riehen, near Basel, Switzerland, assignors to J. R. Geigy A.-G., Basel, Switzerland
No Drawing. Filed Apr. 4, 1963, Ser. No. 270,561
Claims priority, application Switzerland Apr. 18, 1962
4 Claims. (Cl. 260—246)

The present invention concerns a process for the production of pigments of the dioxazine series.

It has been found that pigments of the dioxazine series are obtained by heating to temperatures of at least 100° C. a stirrable mixture consisting substantially of one or several water-soluble non-oxidizing inorganic salts, the aqueous solution of which reacts either neutral or acid, but not alkaline, and of a 2,5-bis-phenylamino-3,6-dichloro-1,4-benzoquinone wherein the phenylamino radicals are ring-substituted in 2'-position with an ether group, in particular 2,5 - bis - (2' - alkoxy - phenylamino) - 1,4-benzoquinones, 2,5 - bis - (2' - cycloalkoxy - phenylamino) - 1,4 - benzoquinones, 2,5 - bis - (2' - benzyloxyphenylamino) - 1,4 - benzoquinones or 2,5 - bis - (2'-phenyloxy - phenylamino) - 1,4 - benzoquinone wherein the phenylamino, the benzyloxy or the phenyloxy radicals can be further ring-substituted by the substituents given further below.

The 1,4 - benzoquinone compounds used as starting compounds may contain as alkoxy groups in the 2'-position at the phenylamino moiety; for example, the lower alkoxy radicals methoxy, ethoxy, propoxy, isopropoxy, n-butoxy, sec. butoxy or t-butoxy, or as hydroxy-lower alkoxy radicals, for instance, the β-hydroxyethoxy group; as cycloalkoxy group they may contain the cyclohexyloxy group; they may further contain the ring-unsubstituted benzyloxy group or a chlorobenzyloxy, lower alkylbenzyloxy, or bromobenzyloxy group, and as aryloxy groups they may contain, e.g. the phenoxy group or a ring-substituted phenoxy group such as a bromo- or chloro-phenoxy, a lower alkylphenoxy or a lower alkoxyphenoxy group.

The starting materials may contain, as further substituents in the phenyl nuclei of the phenylamino groups, in 2- and 5-position: chemically inert aliphatic, cycloaliphatic, araliphatic or aromatic groups, halogen, alkoxy, aryloxy, aralkyloxy radicals, carboxylic acid ester, sulfonic acid aryl ester, carboxylic acid amide and sulfonic acid amide groups, acylamino, acyl, nitro, cyano, trifluoromethyl groups.

Preferred as such substituents in these phenylamino groups are lower alkyl, cyclohexyl, benzyl, phenyl, chlorine, bromine, lower alkoxy, phenyloxy, benzyloxy, lower alkyl lower alkanoates, phenyl sulfonate, carbamyl (—CO—NH$_2$) and N-phenyl-carbamyl, N-mono and di-lower alkyl carbamyl, N-lower alkyl-N-phenyl carbamyl, sulfamyl, N-phenyl-sulfamyl, N-lower alkyl sulfamyl, lower-alkyl-carbonyl amino, lower alkoxy-carbonyl amino, benzoylamino, nitro, cyano, trifluoromethyl, benzoyl, lower alkyl - sulfonyl, phenylsulfonyl, pyridinoylamino [pyridine-(2)-carbonyl-amino] and furoylamino

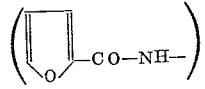

and all of the aforesaid benzene ring-containing substituents in which the benzene ring contains as substituent bromine, chlorine, lower alkyl and/or lower alkoxy groups; benzoylamino and phenylsulfonylamino may also be further substituted with the nitro or the cyano group.

Water-soluble, non-oxidizing neutral to acid salts preferred for use according to the invention are the ammonium and alkali metal salts of sulfuric acid, or hydrochloric acid, e.g. ammonium chloride, ammonium sulfate, sodium chloride, sodium sulfate, sodium hydrogen sulfate, potassium chloride, potassium sulfate and potassium hydrogen sulfate, moreover calcium chloride.

In order to reduce the reaction temperature and to attain better transference of heat, advantageously only such amount of high-boiling organic solvent is added to the benzoquinone-salt mixture as to leave this latter in a solid or tough pasty state at room temperature.

Suitable solvents are those which are non-miscible with water, e.g. unsubstituted or optionally halogenated and/or nitrated saturated aliphatic or aromatic hydrocarbons such as high boiling petroleum fractions, toluene, xylenes, diphenyl, naphthalene, tetraline, chlorobenzene, di- and tri-chlorobenzenes and chloronaphthalene, nitrobenzene, aromatic ethers such as diphenyl ether, aryl polycarboxylic acid esters, especially phthalic acid lower alkyl esters such as dibutyl or dioctyl phthalate, and organic solvents which are miscible with water, for example, aliphatic and aromatic hydroxyl compounds such as higher-boiling fatty alcohols, alkylene glycols and polyalkylene glycols as well as their monoethers, e.g. ethylene glycol or ethylene or diethylene glycol monomethyl or monoethyl ethers, or also phenols as well as saturated aliphatic or aromatic acid anhydrides such as succinic acid anhydride or phthalic acid anhydride.

To accelerate the reaction it is often advantageous to add slight amounts of acid condensing agents to the reaction mixture, for example, organic carboxylic or sulphonic acids such as di- and tri-chloroacetic acid, lauric, myristic, succinic, benzoic or phthalic acid or methane sulphonic acid, ethane sulphonic acid, benzene sulphonic acid, toluene sulphonic acid or xylene sulphonic acid, inorganic acids such as sulfuric acid, polyphosphoric acids or boric acid, acid metal chlorides such as aluminum chloride, zinc chloride or ferric-(III)-chloride, also organic acid chlorides such as lauroyl chloride, myristyl chloride or benzoyl chloride—the latter optionally nuclear substituted—or benzene or toluene sulfonic acid chloride or chlorides of organic ortho acids such as benzotrichloride.

The mixture of 2,5 - bis - (2'-alkoxyphenylamino)-1,4-benzoquinone, 2,5 - bis - (2-cycloalkoxyphenylamino)-1,4-benzoquinone, 2,5-bis-(2' - aralkoxyphenylamino)-1,4-benzoquinone or 2,5-bis-(2'-aryloxyphenylamino) - 1,4-benzoquinone on the one hand and an inorganic salt on the other hand, is heated to a temperature of 100 to 350° C., advantageously to 150 to 260° C. In the mixture, the weight ratio of salt to the benzoquinone compound is advantageously 5:1 to 1:1. After cooling, it is often useful to treat the product obtained with alkali.

It is an especial advantage of the process according to the invention that dioxazines suitable as pigments are obtained in high yields (80 to 90% and higher). They can be conditioned by conventional methods, e.g. they are ground with salts and/or organic solvents. Other important advantages of the process according to the invention reside in the relatively low amounts of solvents required; furthermore, the resulting pigment product is obtained directly in mixture with the grinding assistants which are necessary for its conditioning, and they must not be added in a sequent step to pigments produced by the known methods. It is a further advantage that both the chemical reaction effecting ring closure as well as the conditioning treatment of the resulting product can be performed in one and the same apparatus, for example in a heatable kneader, which means a considerable saving of time and labor.

Further details can be seen from the following non-limitative examples. Where not otherwise expressly stated, parts are given therein as parts by weight. The temperatures are in degree centigrade. The relationship of parts by weight to parts by volume is as that of grams to cubic centimeters.

In the examples, stirring is effected at such speed that a uniform heating of the entire reaction mass to the stated reaction temperatures is achieved.

*Example 1*

30 parts of 3,6-dichloro-2,5,-bis-(2',5'-diethoxy-4'-acetylaminophenylamino)-1,4-benzoquinone are thoroughly mixed with 60 parts of dry sodium sulfate and the mixture is heated, while stirring, for 30 minutes at 240–260°. After extracting with hot dilute sodium hydroxide solution, 23.5 parts of 2,6-di-acetylamino-3,7-diethoxy-9,10-dichlorotriphene dioxazine, which is sufficiently pure for analysis, are obtained.

*Example 2*

30 parts of 3,6-dichloro-2,5-bis-(2',5'-diethoxy-4'-benzoylaminophenylamino)-1,4-benzoquinone and 60 parts of dry calcium chloride are thoroughly mixed and the mixture is heated, while stirring, for 15 minutes at 250–260°. After cooling, the whole reaction mass is milled in a ball mill for 1½ hours after adding 4 parts of a petroleum fraction which boils at 180–240°. After extracting, first with hot dilute hydrochloric acid and then with hot dilute sodium hydroxide solution, the extracted cake consists of 20.5 parts of blue-violet 2,6-dibenzoylamino-3,7-diethoxy-9,10-dichlorotriphene dioxazine of good color strength.

When carrying out the process described in this example, but replacing the 3,6-dichloro-2,5-bis-(2',5'-diethoxy-4'-benzoylaminophenylamino)-1,4 - benzoquinone by 30 parts of 3,6-dichloro-2,5-bis-(2',5'-dimethoxy-4'-p-chlorobenzoylaminophenylamino)-1,4 - benzoquinone or by 30 parts of 3,6-dichloro-2,5-bis-(2',5'-diethoxy-4'-p-methylbenzoylaminophenylamino)1,4 - benzoquinone, equally good yields of the blue 2,6-bis-(4'-chlorobenzoylamino)-3,7-dimethoxy-9,10-dichlorotriphene dioxazine or the blue 2,6-bis(4'-methylbenzoylamino)-3,7-diethoxy-9,10-dichlorotriphene dioxazine, respectively, are obtained.

*Example 3*

20 parts of 3,6-dichloro-2,5-bis-(2',5'-diethoxy-4'-acetylaminophenylamino)-1,4-benzoquinone, 60 parts of dry sodium sulfate and 6 parts of diethylene glycol monomethyl ether (Methylcarbitol) are heated together, while stirring, for 15 minutes at 190–200°. After cooling, the solid reaction mass is extracted with hot dilute sodium hydroxide solution. After drying, a cake of 14.4 parts of 2,6-diacetylamino-3,7 - diethoxy-9,10-dichlorotriphene dioxazine is obtained.

*Example 4*

20 parts of 3,6-dichloro-2,5-bis-(2'-phenoxy-5'-benzoylphenylamino)-1,4 - benzoquinone are thoroughly mixed with 60 parts of dry sodium sulfate and 4 parts of ethylene glycol monophenyl ether (Phenylcellosolve) and the mixture is then heated in a heatable kneader for 20 minutes at 210–220°. The cooled reaction mass is first extracted with a hot aqueous and then with an alcoholic sodium hydroxide solution (about 2%—NaOH) and is finally washed neutral with water. After drying 9.6 parts of 3,7-dibenzoyl-9,10-dichlorotriphene dioxazine are obtained as brown crystals with metallic green reflex.

3,7-dibenzoyl-9,10-dichloro-triphene dioxazine is also obtained with similarly good yields, when replacing the 3,6-dichloro - 2,5 - bis - (2'-phenoxy-5'-benzoylphenylamino)-1,4-benzoquinone used in the above Example 4 by about 20 parts of 3,6-dichloro-2,5-bis-(2'-p-chlorophenoxy-5'-benzoylphenylamino)-1,4 - benzoquinone or 3,6-dichloro-2,5-bis - (2'-o-methylphenoxy - 5' - benzoylphenylamino)-1,4-benzoquinone or 3,6-dichloro-2,5-bis-(2'-o-ethylphenoxy-5'-benzoylphenylamino - 1,4 - benzoquinone and carrying out the said example in the same manner as described above.

Instead of sodium sulfate and ethylene glycol monophenyl ether there can also be used sodium chloride and 1-chloronaphthalene or 4 parts of a petroleum fraction boiling at 200–250°.

*Example 5*

20 parts of 3,6-dichloro-2,5-bis-(2'-methoxy-4'-benzoylamino-5'-methylphenylamino) - 1,4 - benzoquinone, 60 parts of dry sodium sulfate, 4 parts of 1-chloronaphthalene and 10 parts of benzoic acid are thoroughly mixed and the mixture is heated while stirring, for 15 minutes at 220–225°. A green, well-stirrable paste is obtained which solidifies on cooling. The resulting solid cake is then milled in a ball mill, extracted with hot dilute sodium hydroxide solution (2%—NaOH), the suspension is filtered, and the residue is washed with water and alcohol and dried. 10 parts of a reddish violet 2,6-dibenzoylamino-3,7-dimethyl - 9,10 - dichloro-triphene dioxazine of good color strength are obtained.

Instead of benzoic acid and 1-chloronaphthalene used in the above Example 5, there can also be used either benzene sulphonic acid, or succinic acid together with 1-chloronaphthalene, or benzoic acid can be used alone.

*Example 6*

30 parts of 3,6-dichloro-2,5-bis-(2'-5'-dimethoxy-4'-o-chlorobenzoylaminophenylamino) - 1,4 - benzoquinone, 90 parts of sodium sulfate, 10 parts of a petroleum fraction boiling at 200 to 250° and 5 parts of o-chlorobenzoyl chloride are thoroughly mixed and the mixture is heated for 1 hour at 180–190° while stirring. After cooling, the reaction mass is milled in a ball mill for 2 hours. After extracting the resulting powder, first with hot aqueous hydrochloric acid, 2% —HCl) and then with hot aqueous sodium hydroxide solution (2% —NaOH), and drying, 20 parts of a pure violet pigment, 2,6-bis-(2'-chlorobenzoylamino) - 3,7 - dimethoxy-9,10-dichlorotriphene dioxazine, of good color strength are obtained.

What is claimed is:
1. In a process for the production of substantially water-insoluble dioxazine, which comprises reacting an inorganic salt and a 2,5-bis-phenylamino-3,6-dichloro-1,4-benzoquinone wherein the phenylamino radicals are ring-substituted in 2'-position with an ether group, and extracting the resulting reaction product in a crude to finely ground state, the improvement wherein
  (a) the inorganic salt is water-soluble and non-oxidizing and is selected from the group consisting of the ammonium and alkali metal salts of sulfuric acid, the ammonium and alkali metal salts of hydrochloric acid, and calcium chloride,
  (b) the ratio of said inorganic salt to said 1,4-benzoquinone is about 1:1 to 5:1,
  (c) the reaction temperature is about 150 to 260° C. and
  (d) the resulting reaction product is extracted with a dilute aqueous alkaline solution.

2. A process as described in claim 1 wherein the aforesaid ether group is a member selected from the group consisting of alkoxy, cycloalkoxy, aralkoxy and aryloxy.

3. A process as described in claim 1, wherein a high boiling organic solvent is added to said mixture in so small an amount that the resulting mixture remains solid to tough-pasty.

4. A process as described in claim 1, wherein a small catalytically active amount of an acid-condensing agent capable of accelerating ring closure of the said phenylamino-1,4-benzoquinone molecule to the corresponding dioxazine is added to said mixture.

References Cited in the file of this patent
UNITED STATES PATENTS

| | | |
|---|---|---|
| 2,918,465 | Lytle et al. | Dec. 22, 1959 |
| 3,036,071 | Frey et al. | May 22, 1962 |